United States Patent
Sundararajan et al.

(10) Patent No.: US 10,237,004 B2
(45) Date of Patent: Mar. 19, 2019

(54) INTER-RADIO COMMUNICATIONS FOR SCHEDULING OR ALLOCATING TIME-VARYING FREQUENCY RESOURCES

(71) Applicant: AVAGO TECHNOLOGIES INTERNATIONAL SALES PTE. LIMITED

(72) Inventors: Vijay Sundararajan, Fremont, CA (US); Sriram Sundararajan, Sunnyvale, CA (US); Payam Rabiei, Sunnyvale, CA (US); Hrishikesh Atre, Sunnyvale, CA (US); Yury Gonikberg, San Jose, CA (US); Neeraj Poojary, San Rafael, CA (US); Suryakant Maharana, Bangalore (IN); Avinash Renuka, Sunnyvale, CA (US); Mohammad Karim, Richardson, TX (US); Jihui Chen, San Diego, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 135 days.

(21) Appl. No.: 15/192,520

(22) Filed: Jun. 24, 2016

(65) Prior Publication Data

US 2017/0346578 A1    Nov. 30, 2017

Related U.S. Application Data

(60) Provisional application No. 62/341,350, filed on May 25, 2016.

(51) Int. Cl.
H04B 1/10       (2006.01)
H04B 17/318    (2015.01)

(52) U.S. Cl.
CPC .................. *H04B 17/318* (2015.01)

(58) Field of Classification Search
None
See application file for complete search history.

(56) References Cited

U.S. PATENT DOCUMENTS

| | | | |
|---|---|---|---|
| 9,214,973 B1* | 12/2015 | Venkatesh | H04B 1/1036 |
| 2004/0266383 A1* | 12/2004 | Mattellini | H04L 25/03006 455/307 |
| 2010/0135256 A1* | 6/2010 | Lee | H04W 16/14 370/336 |
| 2010/0177857 A1* | 7/2010 | Huttunen | H04L 27/2614 375/350 |
| 2013/0196609 A1* | 8/2013 | Ancora | H04B 1/1036 455/78 |
| 2014/0086162 A1* | 3/2014 | Rimini | H04B 1/10 370/329 |
| 2015/0133185 A1* | 5/2015 | Chen | H04W 72/1215 455/552.1 |
| 2017/0187418 A1* | 6/2017 | Dafesh | H04B 1/7107 |

* cited by examiner

*Primary Examiner* — Gregory B Sefcheck
*Assistant Examiner* — Jenkey Van
(74) *Attorney, Agent, or Firm* — Xsensus/Broadcom

(57) ABSTRACT

A device includes circuitry configured to determine characteristics of jammer signals associated with a first wireless protocol of another device. An amount of interference between the jammer signals and a first received signal at the device associated with a second wireless protocol is determined, and the jammer signals are filtered from the second received signal when the amount of interference between the jammer signals and the first received signal is greater than a first predetermined threshold.

18 Claims, 17 Drawing Sheets

| Input parameter | Amplifying Information |
|---|---|
| LTE/GSM center frequency | |
| LTE_system_BW | • Slow varying quantity.<br>• Sent from ARM to SVMP memory. |
| WLAN center frequency | |
| WLAN_system_BW | |
| LTE VRB | • Sent through GCI interface to SVMP memory.<br>• 16-bit CoEx message. |
| LTE allocated RB number | |

| Identifier | 16 | 15 | 14 | 13 | 12 | VRB 11 | 10 | 9 | 8 | 7 | 6 | 5 | 4 | # of RB 3 | 2 | 1 |
|---|---|---|---|---|---|---|---|---|---|---|---|---|---|---|---|---|
| | 0 | 0 | 0 | 1 | 1 | 0 | 0 | 0 | 0 | 0 | 0 | 0 | 0 | 0 | 0 | 1 |

1002:

| Identifier | 16 | 15 | 14 | 13 | 12 | VRB 11 | 10 | 9 | 8 | 7 | 6 | 5 | 4 | # of RB 3 | 2 | 1 |
|---|---|---|---|---|---|---|---|---|---|---|---|---|---|---|---|---|
| | 1 | 0 | 0 | 0 | 0 | 0 | 0 | 0 | 0 | 0 | 0 | 0 | 0 | 0 | 0 | 0 |

INTER-RADIO COMMUNICATIONS FOR SCHEDULING OR ALLOCATING TIME-VARYING FREQUENCY RESOURCES

CROSS-REFERENCE TO RELATED PATENT APPLICATIONS

The present application claims the benefit of the earlier filing date of U.S. provisional application 62/341,350 having common inventorship with the present application and filed in the U.S. Patent and Trademark Office on May 25, 2016, the entire contents of which being incorporated herein by reference.

BACKGROUND

Technical Field

The present disclosure is directed to managing time varying frequency resources in a communication device.

Description of the Related Art

Communication systems typically operate in accordance with one or more communication standards. Wireless communication systems may operate in accordance with one or more standards including, but not limited to, Institute of Electrical and Electronics Engineers (IEEE) 802.11, Wi-Fi Direct, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof. Radio frequency (RF) signals of the wireless communication systems are transmitted over a wide range of frequencies. When RF signals are communicated at frequencies that overlap or are in close proximity to each other, the RF signals can mutually interfere with each other resulting in degraded performance. Examples of RF signals that can mutually interfere include, e.g., cellular long term evolution (LTE) signals, wireless local area network (WLAN) signals.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 9 is an exemplary table of dynamic input parameters and slowly-varying parameters, according to certain embodiments;

FIG. 10 is an exemplary diagram of coexistence messaging formats, according to certain embodiments;

DETAILED DESCRIPTION

Figure 1:
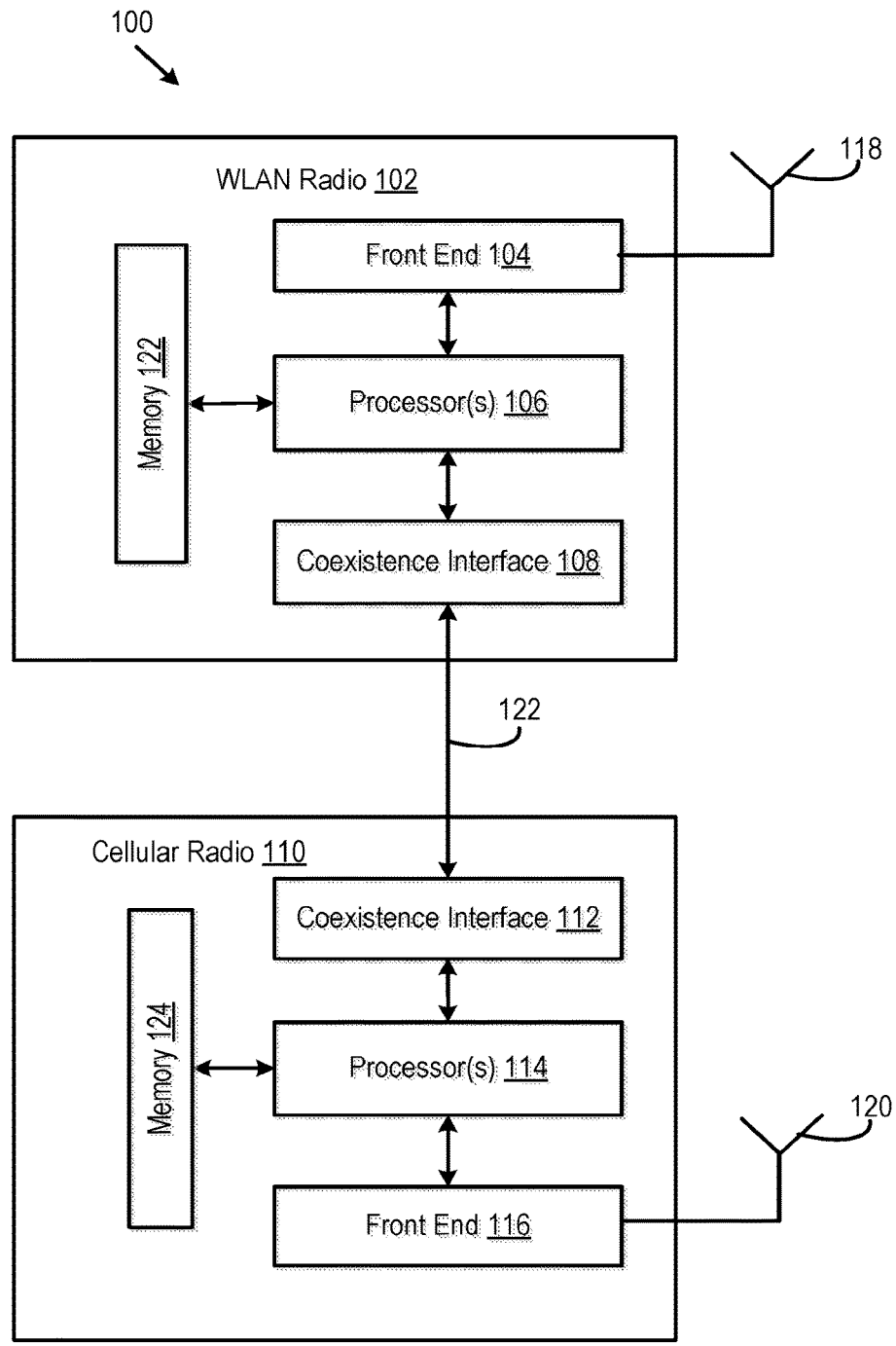
FIG. 1 is an exemplary diagram of radios in an electronic device, according to certain embodiments.

In the drawings, like reference numerals designate identical or corresponding parts throughout the several views. Further, as used herein, the words "a," "an" and the like generally carry a meaning of "one or more," unless stated otherwise.

In an exemplary implementation, a device includes circuitry configured to determine characteristics of jammer signals associated with a first wireless protocol of another device. An amount of interference between the jammer signals and a first received signal at the device associated with a second wireless protocol is determined, and the jammer signals are filtered from the second received signal when the amount of interference between the jammer signals and the first received signal is greater than a first predetermined threshold.

In a further exemplary implementation, a process includes determining characteristics of jammer signals associated with a first wireless protocol of another device; determining an amount of interference between the jammer signals and a first received signal at the device associated with a second wireless protocol; and filtering the jammer signals from the second received signal in a case that the amount of interference between the jammer signals and the first received signal is greater than a first predetermined threshold.

In a further exemplary implementation, a wireless local area network (WLAN) radio includes circuitry configured to communicate with a cellular radio co-located in an electronic device via a generalized coexistence interface (GCI), receive signal data associated with cellular transmissions from the cellular radio via the GCI, and filter interference corresponding to harmonics of the cellular transmissions from a received WLAN signal.

Aspects of the present disclosure are directed to a system, device, or method for detecting interference between detecting interference between wireless local area network (WLAN) signals and harmonics of cellular radio signals, such as Long Term Evolution/Global System for Mobile Communications (LTE/GSM) signals in a communication device that is configured to perform wireless communications through one or more wireless protocols. For example, second and third harmonics of LTE/GSM uplink frequencies can interfere with a WLAN frequency band, which can result in degraded performance of the WLAN signals. If overlap between the LTE/GSM harmonics is detected, a notch filter can be applied at the overlapping frequency locations.

FIG. 1 is an exemplary block diagram of a WLAN radio 102 and a cellular radio 110 in an electronic device 100, according to certain embodiments. The electronic device 100 may include any type of device that has multiple radios that can be configured to communicate via multiple wireless protocols, such as a mobile device, tablet, laptop, and the like. The cellular radio 110 is a transceiver that includes a front end 116 capable of supporting cellular communications that can include LTE/GSM communications via front end circuitry that can include amplifiers, filters, and one or more cellular antennas 120 that can include multiple input multiple output (MIMO) antenna configuration. In some implementations, the cellular radio 110 may be a single-chip radio that includes one or more processors 114 that configure the transmitted signals, process the received signals, and determine characteristics of hardware and/or software components of the cellular radio 110 based on controllable parameters. In addition, the one or more processors 114 of the cellular radio 110 may communicate with a host processor (not shown) of the electronic device 100 external to the radio chip. The cellular radio 110 can also include memory 124 that can store data as well as software instructions executed by the one or more processors 114.

The WLAN radio 102 is a transceiver that includes front end 104 capable of transmitting and receiving WLAN signals via front end circuitry that can include amplifiers, filters, and one or more antennas 102 that can also be configured for MIMO operations. The WLAN radio 102 may support IEEE 802.11 wireless communication protocols or any other wireless communication protocol. In some implementations, the WLAN radio 102 is a single-chip radio that includes one or more processors 106 that generate transmitted signals, process received signals, and determine characteristics of hardware and/or software components of the WLAN radio 102 based on controllable parameters, such as filter frequency location, filter depth, filter mode parameters, and the like. In addition, the one or more processors 106 of the WLAN radio 102 may communicate with the host processor of the electronic device 100 external to the radio chip. In some implementations, the processors 106 of the wireless radio 102 can include an Advanced RISC Machine (ARM) processor, a vector application specific processor (VASIP), and/or any other type of digital signal processor (DSP) with processing circuitry that can be configured to perform the processes described further herein. In addition, the WLAN radio 102 can include memory 122 that can store data as well as software instructions executed by the processing circuitry of the one or more processors 106. The memory 122 represents multiple memories 122 that can operate in parallel processing circuits. For example, the memory 122 can include a SVMP memory that stores data from the VASIP.

The WLAN radio 102 and cellular radio 110 can also each include generalized coexistence interfaces (GCIs) 108 and 112 that allow the radios 102 and 110 to exchange information with low latency via a communication path 122 between the WLAN radio 102 and the cellular radio 110 via a predetermined messaging protocol. In some implementations, the communication path 122 is a bit pipe interface such as a two-wire high speed universal synchronous receiver/transmitter (DART). The communication path 122 allows for sending and receiving both real time signals (with a processing latency in the order of microseconds) and commands (with a processing latency in the order of a millisecond) between the cellular modem 106 and wireless connectivity unit 109. For example, the WLAN radio 102 can receive cellular signal parameters associated with the cellular radio 110 via the GCI 108 in order to determine whether harmonics of the cellular signals interfere with WLAN signals received by the WLAN 102.

The GCIs 108 and 112 allow the cellular signal parameters that vary dynamically such as a virtual resource block (VRB) number and a number of allocated resource blocks (RBs) to be received by the WLAN radio 102 at a higher rate than other cellular or WLAN signal parameters that vary at a slower rate than the dynamically-varying cellular signal parameters. For example, signal bandwidth or center frequency parameters may vary at a slower rate than the VRB and the number of allocated RBs. Details regarding the signal parameters and determination of signal interference are discussed further herein.

Figure 2:
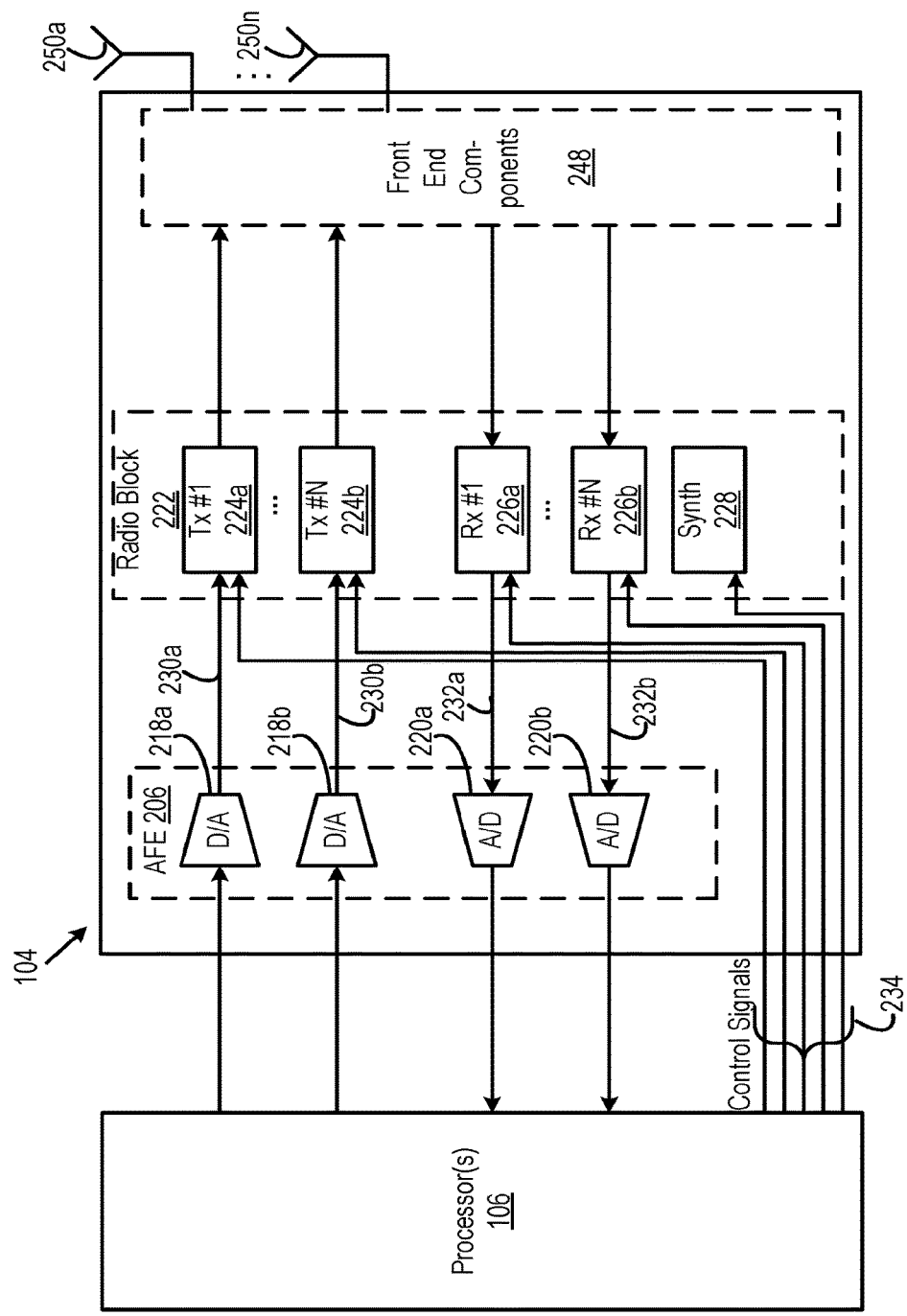
FIG. 2 is an exemplary diagram of a wireless transceiver, according to certain embodiments.

FIG. 2 is an exemplary diagram of the front end 104 of the WLAN radio 102, according to certain embodiments. The front end 104 shown in FIG. 2 corresponds to a MEM transceiver, but any other type of WLAN front end can also be implemented in the WLAN radio 102. The front end 104 can include an analog front end (AFE) 206, a radio block 222, additional front end components 248, and antennas 250a-n.

The radio block 222 includes transmitters 224 a-b, receivers 226 a-b, and a synthesizer 228. The transmitter units 224 a-b each includes at least one of (a) one or more frequency up-conversion stages; (b) one or more variable gain amplification stages; (c) one or more variable bandwidth filtering stages; and (d) circuitry to selectively enable/disable the frequency up-conversion, amplification, and filtering stages. Similarly, receivers 226 a-b each includes at least one of (e) one or more frequency down-conversion stages; (f) one or more variable gain amplification stages; (g) one or more variable bandwidth filtering stages; and (h) circuitry to selectively enable/disable said frequency down-conversion, amplification, and filtering stages. The synthesizer 228 generates and provides frequency conversion signals to the frequency up-conversion stages of transmitters 224 a-b and the frequency down-conversion stages of receivers 226 a-b.

The AFE 206, including a plurality of Digital-to-Analog Converters (DACs) 218 a-b and Analog-to-Digital Converters (ADCs) 220 a-b, is used to convert from digital to analog (from analog to digital) transmit data signals 230 a-b (receive data signals 232 a-b) between the processors 106 and radio block 222.

Radio control signal bundles 234 couple control logic of the processors 106 with respective ones of transmitters 224 a-b, receivers 226 a-b, and synthesizer 228. In an embodiment, radio control signal bundles 234 include transmit radio control signal bundles receive radio control signal bundles, and a synthesizer radio control signal bundle. Each of transmit radio control signal bundles includes control signals to control respective stages (e.g., frequency conversion stages, gain, etc.) of a corresponding transmitter of the radio block 222. Similarly, each of receive radio control signal bundles includes control signals to control respective stages of a corresponding receivers of the radio block 222. Synthesizer radio control signal bundle includes control signals to control respective stages of synthesizer 228.

Figure 3:
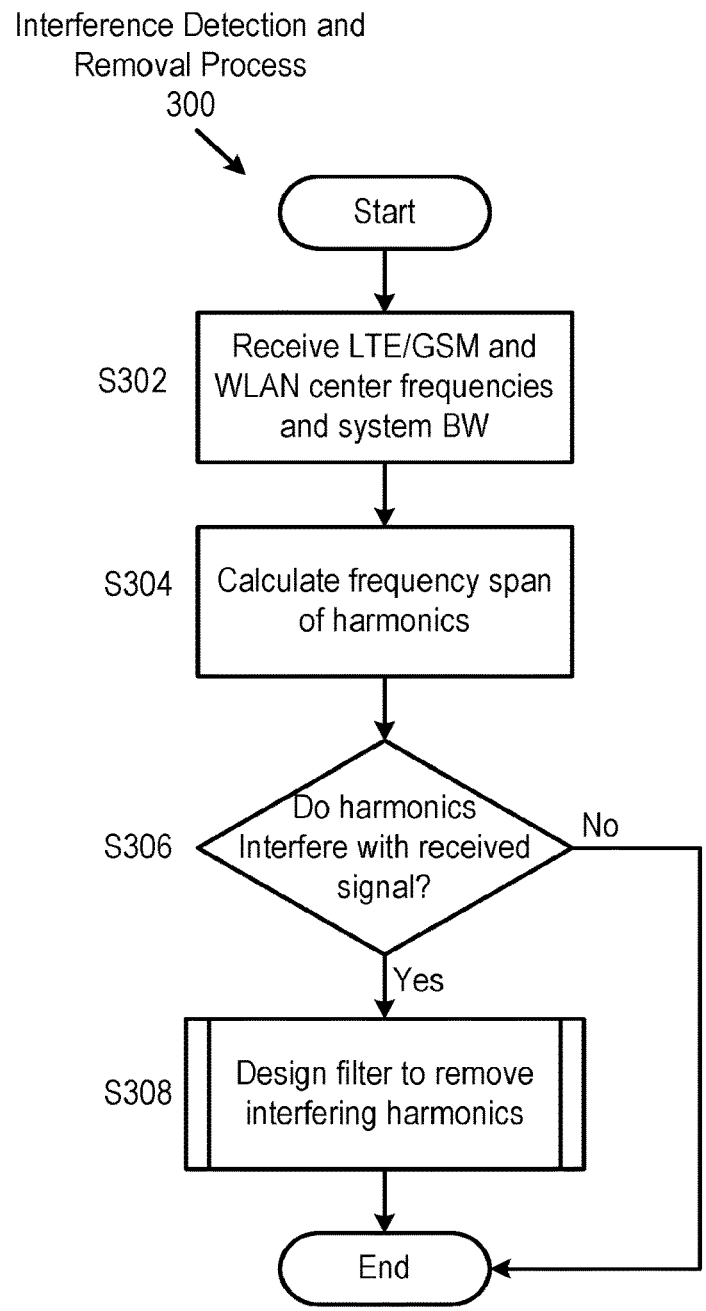
FIG. 3 is an exemplary flowchart of an interference detection and removal process, according to certain embodiments.

FIG. 3 is an exemplary flowchart of an interference detection and removal process 300, according to certain embodiments. The interference detection and removal process 300 is described with respect to interference from cellular (LTE/GSM) signal harmonics with received WLAN signals at the WLAN radio 102, but the process 300 can also be performed by other types of wireless communication radios and/or other types of interference sources than the cellular radio harmonics.

At step S302, the processor 106 receives signal parameters associated with the cellular signals transmitted by the cellular radio 110 as well as signal parameters associated with signals received by the WLAN radio 102. The signal parameters can include slowly-varying parameters and dynamic parameters that vary at a faster rate the slowly-varying parameters. For example, a cellular signal center frequency, a cellular signal bandwidth, a WLAN signal frequency, and a WLAN signal bandwidth can be the slowly-varying parameters. The slowly-varying parameters can be received by the WLAN radio 102 from the host processor of the electronic device 100 or can be stored in the memory 122 of the WLAN radio 102. In addition, the dynamic parameters can include the VRB number and number of allocated RBs of the LTE signals, which are received by the WLAN radio 102 from the cellular radio 110 via the communication path 122 at the GCI 112.

At step S304, the processing circuitry of the processor 106 calculates frequency bands for harmonics associated with the cellular signals based on the signal parameters received at step S302. In some implementations, second and third harmonic frequencies of LTE/GSM signals may overlap with a WLAN frequency band, which can degrade the received WLAN signals. In some aspects, the harmonic frequency bands of the cellular signals may fully overlap, partially overlap, or have no overlap with the received WLAN signals. Throughout the disclosure, the harmonics of the cellular signals can also be referred to interchangeably as jammer signals. Details regarding the overlap between the jammer signals and the received WLAN signals are discussed further herein.

At step S306, the processing circuitry determines whether the jammer signals interfere with the received signals at the WLAN radio 102. In some implementations, the processing circuitry determines whether an amount of interference between the jammer signals and received WLAN signals is greater than a predetermined threshold. If the amount of interference between the jammer signals and the received WLAN signals is greater than the predetermined threshold, resulting in a "yes" at step S306, then step S308 is performed. Otherwise, if the amount of interference between the jammer signals and the received WLAN signals is less than or equal to the predetermined threshold, resulting in a "no" at step S306, then the interference detection and removal process 300 is terminated.

At step S308, if the amount of interference between the jammer signals and the received WLAN signals is greater than the predetermined threshold, the processing circuitry of the processor 106 designs and programs a filter in the front end 104 of the WLAN radio 102 to remove the interference from the jammer signals. If the jammer signals produce narrowband (NB) interference with the received WLAN signals, then a notch filter, such as a digital spur suppression filter (DSSF) can be defined to remove the interference. If the jammer signals produce wideband (WB) interference with the received WLAN signals, then a whitening filter can be applied to the received WLAN signal to remove the interference. In some implementations, the processing circuitry can determine whether to apply notch filter or the whitening filter based on a projected signal quality of the received WLAN signal after applying the notch filter.

If the notch filter is applied, and the received WLAN signal quality is greater than a threshold, then the jammer signals are considered to be NB. Likewise, if the notch filter is applied, and the received WLAN signal quality is less than or equal to the threshold, then the jammer signals are considered to be WB. In addition, the processing circuitry can determine whether to apply the notch filter or the whitening filter based on a bandwidth threshold for the jammer signals. For example, the processing circuitry may apply the notch filter to received WLAN signals that experience interference from jammer signals with a frequency bandwidth of less than 1 MegaHertz (MHz). The whitening filter may be applied for interfering jammer signals with a bandwidth of greater than or equal to 1 MHz to decorrelate the interference across multiple antenna paths, also referred to as receiver cores, of the WLAN radio 102. Details regarding the design and implementation of the notch filter and whitening filter are discussed further herein.

Figure 4:
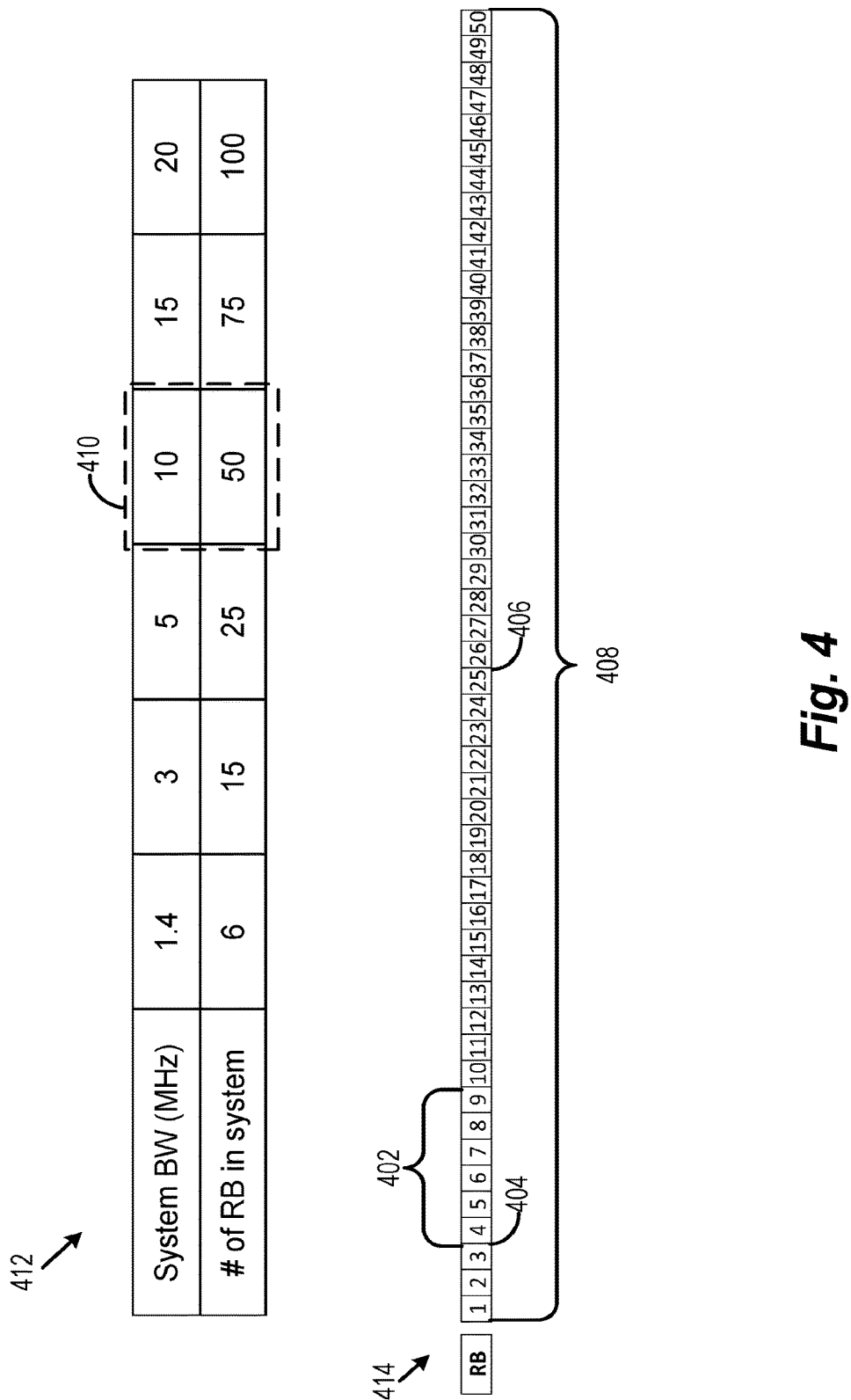
FIG. 4 is an exemplary illustration of cellular network frequency allocations, according to certain embodiments.

FIG. 4 is an exemplary illustration of cellular network frequency allocations for LTE/GSM communications, according to certain embodiments. Diagram 412 shows exemplary LTE system bandwidths and associated numbers of RBs for each system bandwidth where one RB corresponds to twelve consecutive sub-carriers or 0.18 MHz for a duration of one slot (0.5 milliseconds). For example, entry 410 illustrates that a LTE system bandwidth of 10 MHz has 50 RBs. In addition, diagram 414 shows an exemplary user equipment RB allocation for a LTE system bandwidth 408 of 10 MHz having a center frequency 406. For example, a user equipment can be assigned a VRB number 404 that indicates a first RB in a set of allocated RBs. The user equipment can also be assigned a number 402 of RBs. In the diagram 414, the user equipment has a VRB number 404 of 4 and a number of RBs of 6. In some implementations, the VRB number 404 and number of allocated RBs 402 are first signal parameters that are passed to the WLAN radio 102 from the cellular radio 110 via the GCI 112. For GSM, a channel is 0.2 MHz, and one channel is allocated a user equipment at a time.

Figure 5:
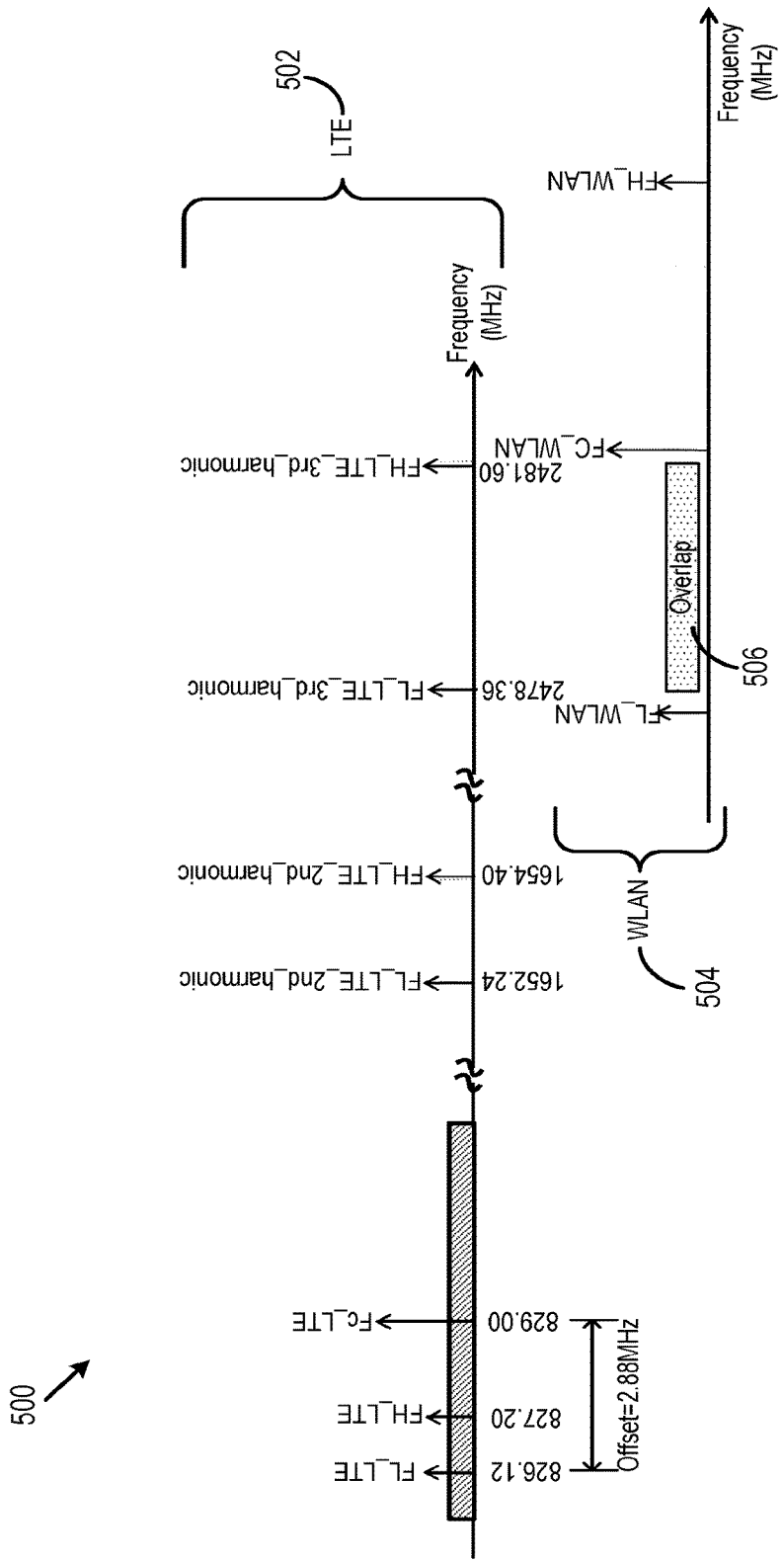
FIG. 5 is an exemplary diagram of cellular and wireless local area network (WLAN) frequency allocations, according to certain embodiments.

FIG. 5 is an exemplary diagram 500 of cellular (LTE) 502 and WLAN 504 signal frequency allocations, according to certain embodiments. The cellular signal frequency allocations 502 include a system center frequency Fc_LTE of 829 MHz, a system bandwidth of 20 MHz, a VRB number of 32, and the number of allocated RB equal to six. Based on the LTE signal parameters, the processing circuitry of the processor 106 can determine that the VRB number and number of allocated RBs correspond to an upper LTE signal frequency FH_LTE of 827.20 MHz and a lower LTE signal frequency FL_LTE of 826.12 MHz. The processing circuitry can also determine harmonic frequencies associated with the allocated cellular frequencies. For example, a second harmonic of an LTE signal can have a lower frequency FL_LTE_2nd_harmonic of 1652.24 MHz and an upper frequency FH_LTE_2nd_harmonic of 1654.40 MHz, and a third harmonic of the LTE signal can have a lower frequency FL_LTE_3rd_harmonic of 2478.36 MHz and an upper frequency FH_LTE_3rd_harmonic of 2481.60 MHz.

In addition, the WLAN signal parameters include a center frequency FC_WLAN of 2484 MHz on Channel 14, and a WLAN system bandwidth of 20 MHz. Based on the WLAN signal parameters, the processing circuitry can determine that the received WLAN signal has a lower frequency FL_WLAN of 2474 MHz and an upper frequency FH_WLAN of 2494 MHz. The processing circuitry of the processor 106 can also determine amount of overlap between the second and third harmonic frequencies of the LTE signals and the WLAN signal frequencies. For example, in the example illustrated in FIG. 5, the third harmonic of the LTE signal that has a bandwidth from 2478.36 MHz to 2481.60 MHz produces an amount of overlap 506 with the WLAN signal that degrades the signal quality of the WLAN signal.

Figure 6:
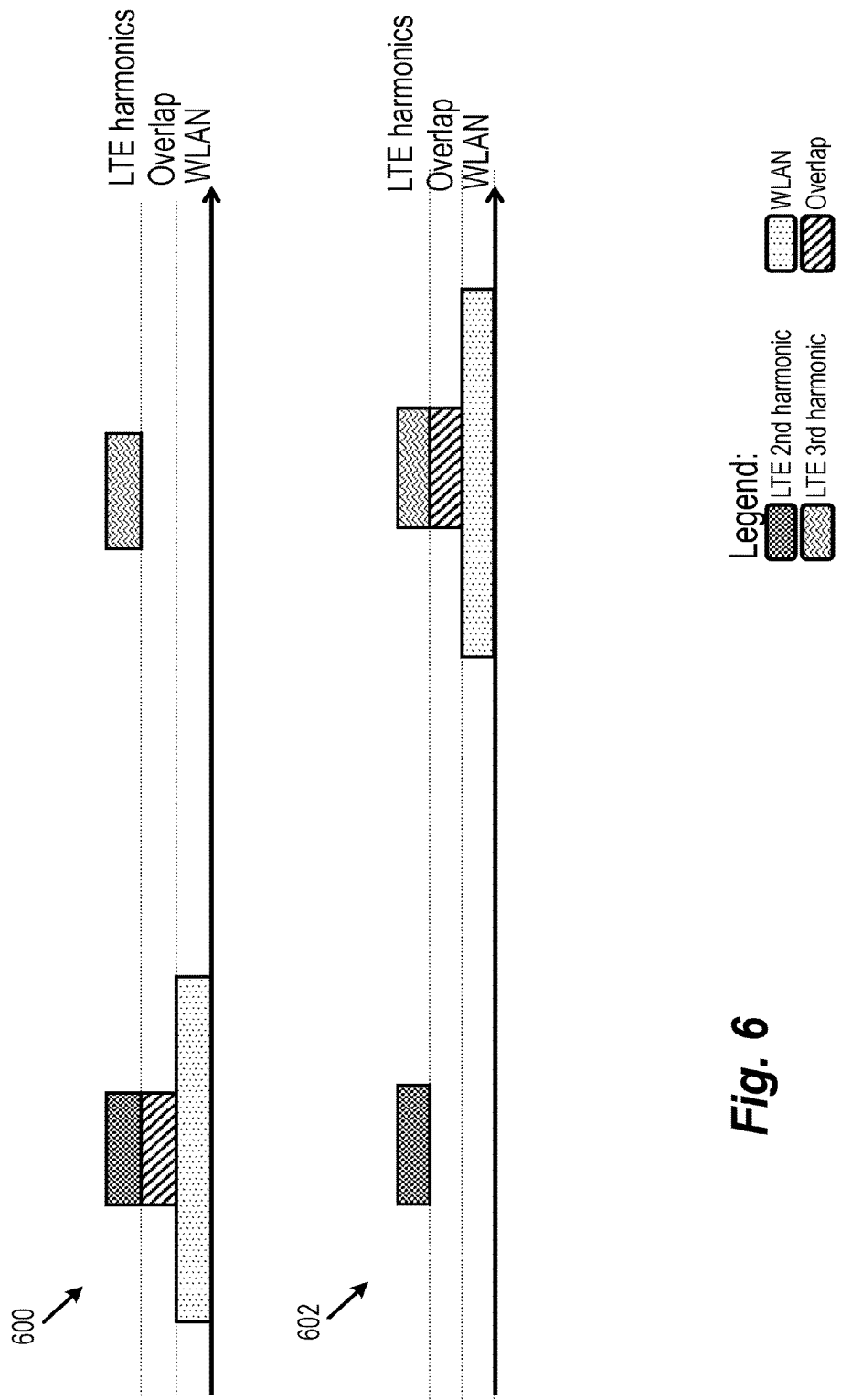
FIG. 6 is an exemplary diagram of overlapping frequency bands of WLAN and LTE jammer signals, according to certain embodiments.
Figure 7:
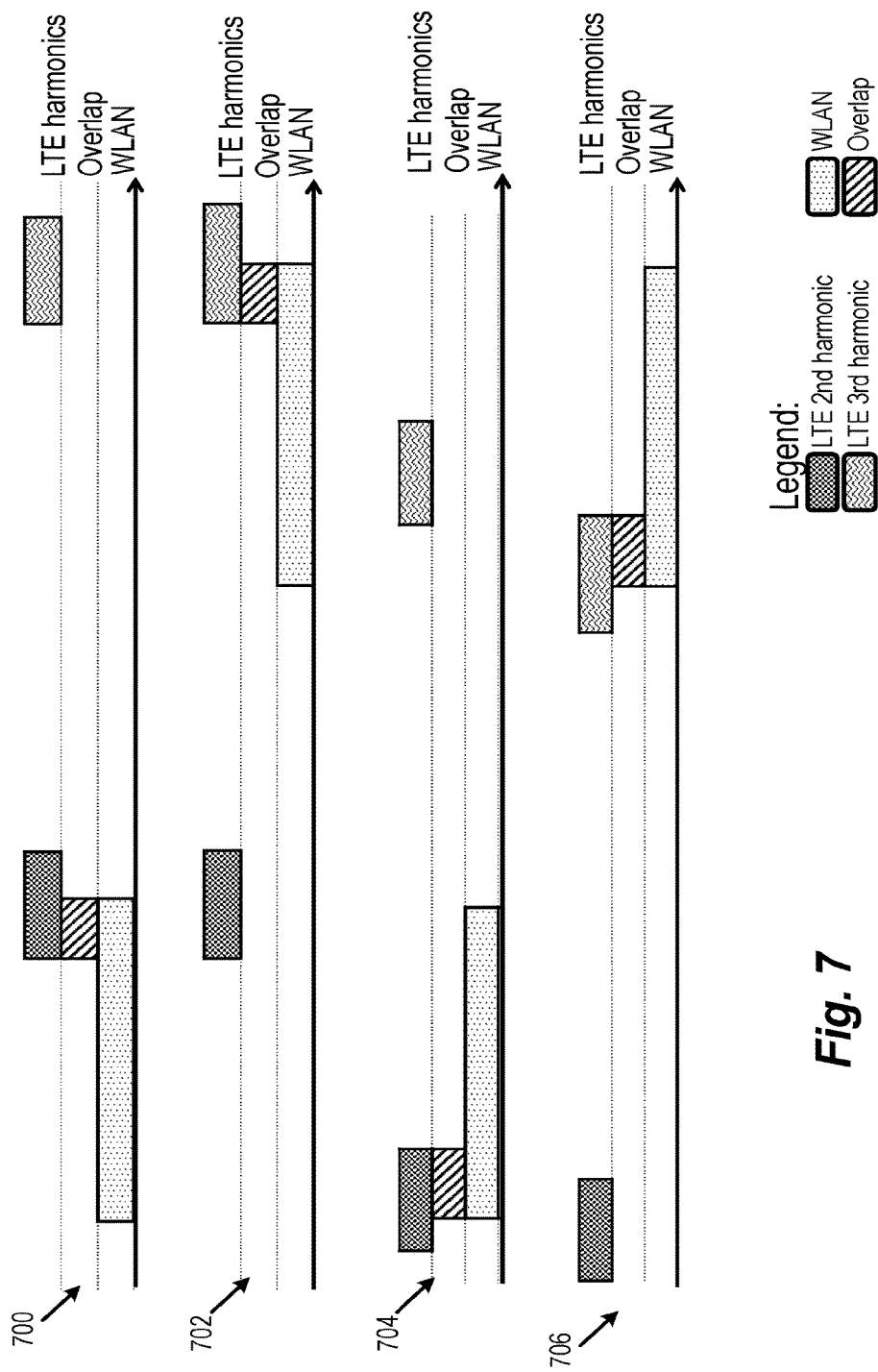
FIG. 7 is an exemplary diagram of partially overlapping frequency bands of WLAN and LTE jammer signals, according to certain embodiments.
Figure 8:
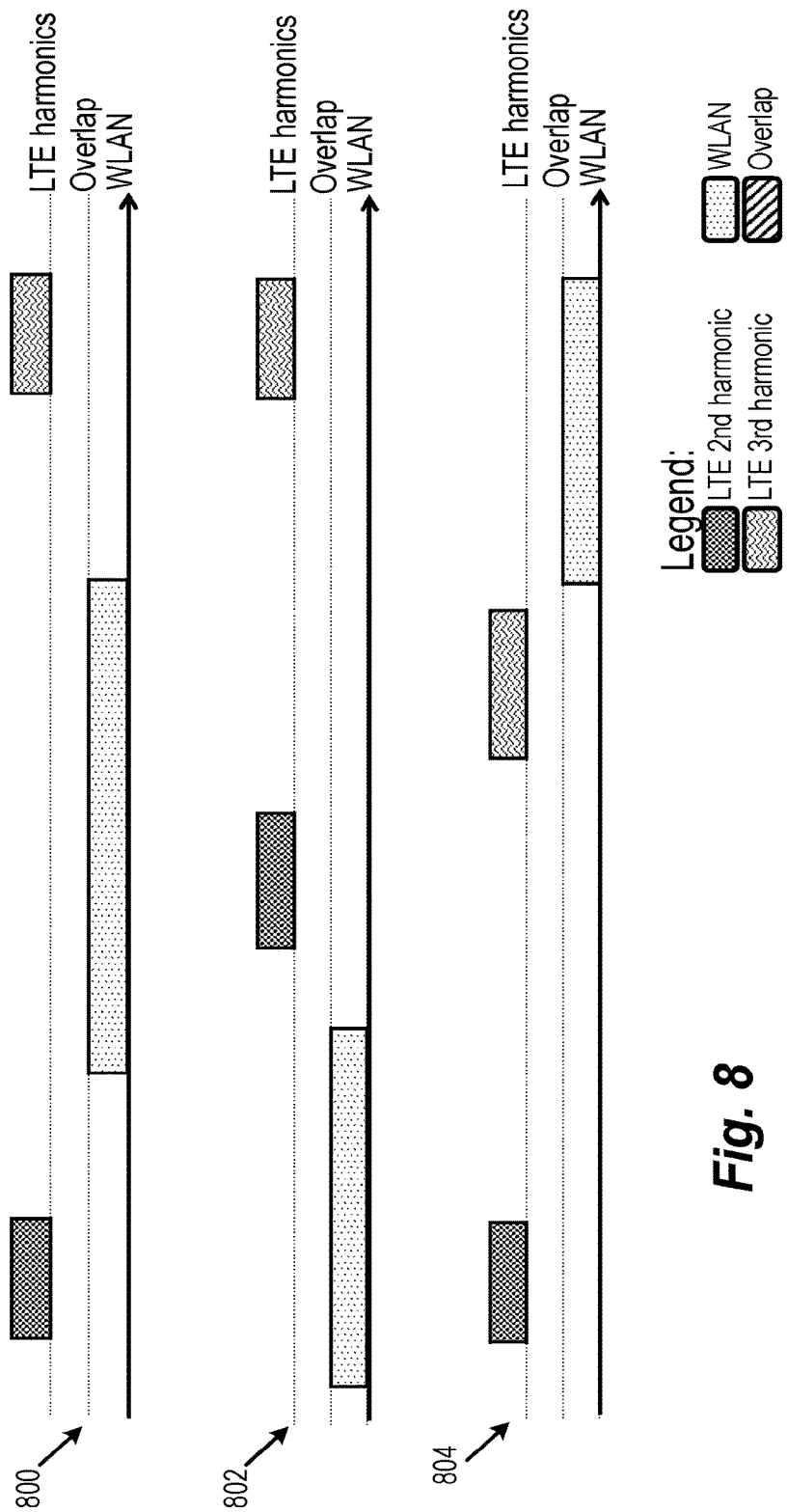
FIG. 8 is an exemplary diagram of non-overlapping frequency bands of WLAN and LTE jammer signals, according to certain embodiments.

FIGS. 6-8 include exemplary diagrams of overlap of jammer signals with a received WLAN signal, according to certain embodiments. FIG. 6 includes diagrams 600 and 602 that illustrate complete overlap of a jammer signal with the received WLAN signal. For example, in the diagram 600, the LTE second harmonic completely overlaps with the received WLAN signal, and in the diagram 602, the LTE third harmonic completely overlaps with the received WLAN signal. FIG. 7 includes diagrams 700, 702, 704, and 706 that illustrate partial overlap of a jammer signal with the received WLAN signal. For example, in the diagram 700 and 704, the LTE second harmonic partially overlaps with the received WLAN signal, and in the diagrams 702 and 706, the LTE third harmonic partially overlaps with the received WLAN signal. FIG. 8 includes diagrams 800, 802, and 804 that illustrate no overlap between jammer signals and the received WLAN signal.

FIG. 9 is an exemplary table 900 of first signal parameters and slowly-varying signal parameters, according to certain embodiments. As discussed previously, the processor 106 of the WLAN radio 102 can use the dynamic and slowly-varying signal parameters to determine an amount of overlap between the jammer signals and the received WLAN signal in order to determine whether or not to apply a filter to remove the interference caused by the interfering jammer signals. As shown in the table 900, the slowly-varying parameters can include the cellular signal (LTE/GSM) center frequency, the cellular signal bandwidth, the WLAN signal frequency, and the WLAN signal bandwidth. The slowly-varying parameters can be sent from the ARM processor to the memory (SVMP) 124 of the WLAN radio 102. In addition, the dynamic parameters can include the VRB number and number of allocated RBs of the LTE signals, which are received by the WLAN radio 102 from the cellular radio 110 via the communication path 122 at the GCI 112 and stored in the memory 124 (SVMP). The first signal parameters can be sent in a predetermined 16-bit coexistence (CoEx) message format.

FIG. 10 is an exemplary diagram of coexistence (CoEx) messaging formats 1000 for LTE and GSM signals, according to certain embodiments. Diagram 1000 is an exemplary 16-bit CoEx message format for a LTE signal, and diagram 1002 is an exemplary 16-bit CoEx message format for a GSM signal. The CoEx message format includes an identifier bit, seven VRB bits allocated to specifying the VRB number, and eight RB bits allocated to specifying the number of allocated RBs, but other bit allocations or message formats can also be implemented. In the diagram 1000 for the LTE signal, the identifier bit is a zero, which corresponds to a LTE signal, the VRB bits correspond to a VRB number of 24, and the RB bits correspond to one allocated RB for the LTE signal. In the diagram 1002 for the GSM signal, the identifier bit is set to one, which corresponds to a GSM signal, and the remaining bits in the CoEx message are set to zero.

Figure 11:
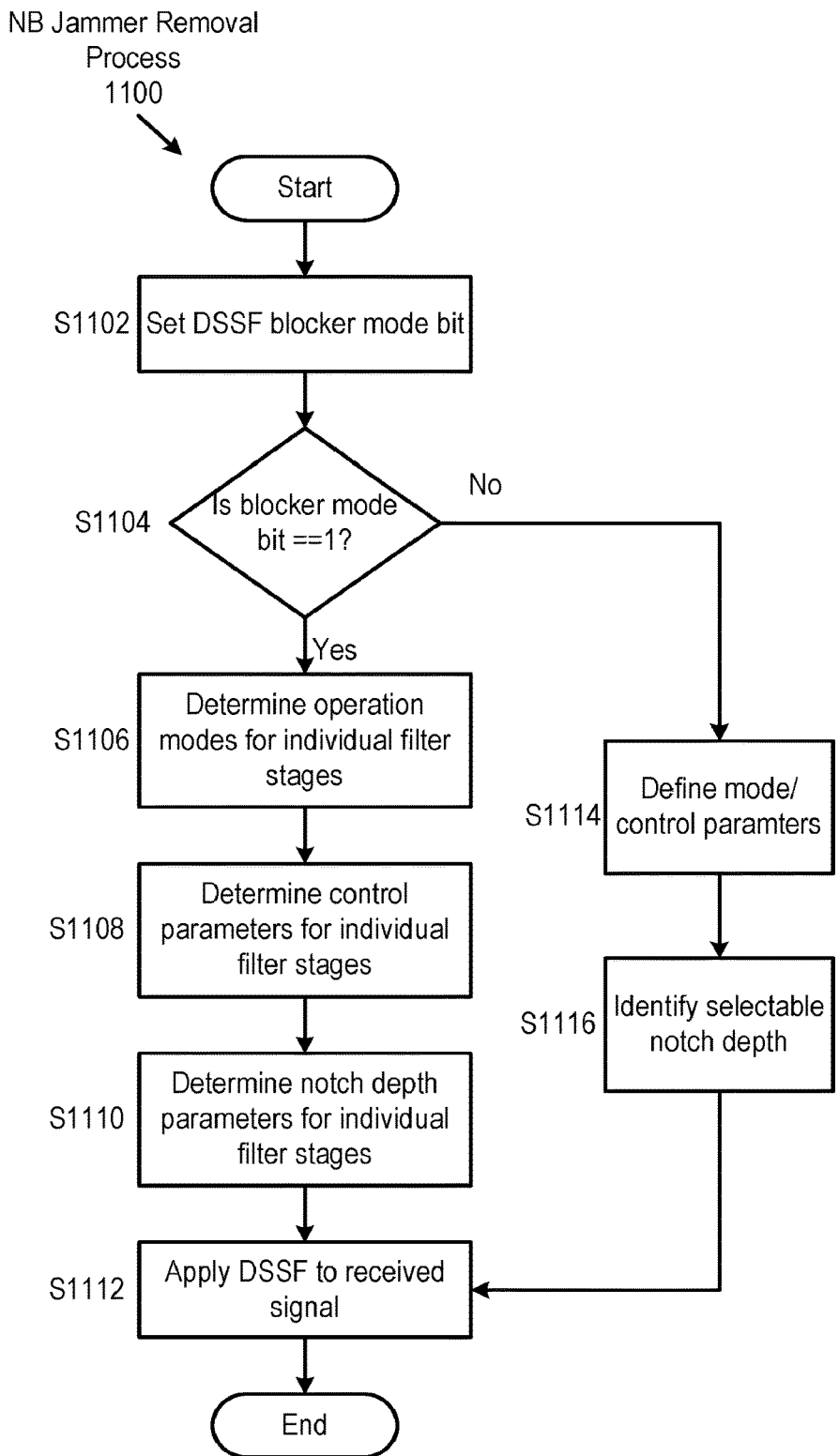
FIG. 11 is an exemplary flowchart of a narrowband (NB) jammer removal process, according to certain embodiments.

FIG. 11 is an exemplary flowchart of a narrowband (NB) jammer removal process 1100, according to certain embodiments. The NB jammer removal process 1100 is an implementation of step S308 of the interference detection and removal process 300 described previously. The NB jammer removal process 1100 can be implemented when the jammer signals produce NB interference that can be removed by applying a notch filter to the received WLAN signals such as a digital spur suppression filter (DSSF). In addition, other types of notch filters than those described herein can also be applied to remove the jammer signals.

At step S1102, a DSSF blocker mode bit is set by the processor 106. The DSSF blocker mode bit defines a control scheme for the DSSF that removes the jammer signal interference from the received WLAN signal. In some implementations, a DSSF blocker mode bit that is set to zero corresponds to a DSSF that is controlled based on criteria where all of the filter stages of the DSSF have the same operation mode, and control parameters for the DSSF are based on predefined filter parameters that are stored in the memory 124 of the WLAN radio 102. In addition, a DSSF blocker mode bit that is set to one corresponds to a DSSF where each filter stage can be defined and controlled independently of the other filter stages. For example, the operation modes and control parameters of the individual stages of the DSSF can be customized based on characteristics of the jammer signal interference with the received WLAN signals. In addition, when the DSSF blocker mode bit is set to one, the DSSF can have three filter stages, which provides greater flexibility than conventional DSSF implementations that have two filter stages. On the other hand, when the DSSF blocker mode bit is set to zero, the DSSF may have two filter stages.

In some aspects, the processing circuitry of the processor 106 can set the DSSF blocker mode bit based on an amount of predictability of the interfering jammer signals. For example, if the jammer signals that interfere with the received WLAN signals have predictable signal patterns that correspond to predefined filter settings, the processing circuitry of the processor 106 may set the DSSF blocker mode bit to zero. However, for jammer signals with characteristics that do not correspond to predefined filter settings, the processing circuitry may set the DSSF blocker mode bit to one so that each of the DSSF stages can be individually controlled based on the jammer signal characteristics.

At step S1104, it is determined whether the DSSF blocker mode bit is set to one, indicating that each stage of the DSSF is individually controlled. If it is determined that the DSSF blocker mode bit is set to one, resulting in a "yes" at step S1104, then step S1106 is performed. Otherwise, if it is determined that the DSSF blocker mode bit is set to zero, resulting in a "no" at step S1104, then step S1114 is performed.

At step S1114, if it is determined at step S1104 that the DSSF blocker mode bit is set to zero, then the DSSF mode and control parameters are determined based on predefined filter parameters that are stored in the memory 124 of the WLAN radio, and all of the filter stages of the DSSF are controlled with the same operation mode. In some implementations, the operation modes for the DSSF filter can include an OFF mode where the filter stages are turned off, an ALWAYS_ON mode where the filter stages of the DSSF are switched on with fixed settings, a carrier sense signal (CRS) mode where the filter stages are enabled with fixed settings during a CRS state, a CRS_STR mode where the filter stages are enabled with fixed settings during CRS and symbol timing recovery (STR) states, or an AUTO mode where the filter stages are switch on with automatic notch depth control. For example, in the AUTO mode, the notch depth is decreased or the filter is turned off when signal strength of the received WLAN signal is greater than an AUTO mode threshold. In the CRS mode, the filter stages may be enabled until a predetermined portion of a signal packet has been received.

The control parameters for the DSSF can include pole-zero pairs for the filter stages, frequency locations, AUTO mode threshold, an enable/disable parameter, and the like. In some aspects, the control parameters for the DSSF may not be individually programmable for the individual filter stages when the DSSF blocker mode bit is set to zero. For example, the pole-zero pair combinations and the frequency locations for the DSSF filter may be accessed from one or more indexed arrays in memory 124 by the processor 106 of the WLAN radio 102 based on an index parameter i_depth that is determined by the processing circuitry. The i_depth parameter is used to select a first static filter coefficient from a first indexed array that corresponds to pole values for the DSSF, and a zero parameter for the DSSF filter stages is fixed based on the filter coefficient selected from the first indexed array. In addition, the frequency locations of the DSSF that correspond to the frequency location of the jammer signals can be specified by e_i_theta and e_j_theta control parameters.

At step S1116, the processing circuitry of the processor 106 determines a notch depth for the DSSF from one or more selectable notch depths. In some implementations, the processing circuitry of the processor 106 selects one of three selectable notch depths for the DSSF based on one or more gain thresholds of the received WLAN signal such that the notch depth is increased as the filter gain is increased. The selectable notch depths may include 6 dB, 12 dB, and 18 dB notch depths, which are selected by the processing circuitry based on the one or more gain thresholds that divide a gain range into regions that correspond to the selectable notch depths. For example, if a desired gain parameter determined through automated gain control (AGC) process is less than a first threshold that corresponds to a first gain region, then the notch depth is set to zero, which indicates that the DSSF is in pass-through. If the desired gain parameter is in a second gain region that is between the first gain threshold and a second gain threshold, then the notch depth is set to 6 dB, and so on.

At step S1106, if it is determined at step S1104 that the DSSF blocker mode bit is set to one, then the processing circuitry of the processor 106 determines operation modes for each individual filter stage of the DSSF. Each filter stage can be in the OFF mode, ALWAYS_ON mode, CRS mode, CRS_STR mode, or AUTO mode. For example, a first filter stage may be in the ALWAYS_ON mode, a second filter stage may be in the OFF mode, and a third filter stage may be in the AUTO mode. The operation modes for each of the filter stages can be written by the processing circuitry of the processor 106 to a DSSF mode vector that includes the modes for each of the DSSF stages.

At step S1108, the processing circuitry determines one or more control parameters for the individual filter stages of the DSSF. The control parameters for the DSSF can include pole-zero pairs for the filter stages, frequency locations, AUTO mode threshold, and the like. Unlike instances where the DSSF mode bit is set to zero, when the DSSF mode bit is set to one, the control parameters for the DSSF are individually programmable for the individual filter stages. For example, the processing circuitry can determine the pole-zero pair combinations and the frequency locations for the three DSSF filter stages, which can be stored in programmable filter registers. The processing circuitry can determine the index parameter i_depth for each stage of the DSSF that corresponds to a first entry in a first indexed array that indicates a pole value for a stage of the DSSF, and a second entry in a second indexed array that indicates a zero value for a stage of the DSSF. For example, each filter stage can have different values for the first entry of the first indexed array and the second entry of the second indexed array.

In addition, the frequency locations of the DSSF that correspond to the frequency location of the jammer signals can be specified by e_i_theta and e_j_theta control parameters that are also determined independently for each of the filter stages. Likewise, each of the filter stages can also have independently determined AUTO mode thresholds. For example, in the AUTO mode, the notch depth for a filter stage can be decreased or the filter stage can be turned off when signal strength of the received WLAN signal is greater than the AUTO mode threshold for that filter stage.

At step S1110, the processing circuitry determines notch depth parameters for the individual filter stages of the DSSF. The notch depths for the filter stages of the DSSF are fully programmable and can be determined by the processing circuitry of the processor 106 based on the desired gain parameter determined by the AGC. For example, the notch depths for one or more of the filter stages can be increased as the desired gain parameter increases or decreased as the desired gain parameter decreases.

At step S1112, the DSSF is applied to the received WLAN signal remove the NB interference from the jammer signals. The applied filter increases a signal-to-noise ratio of the received WLAN signal, which allows the WLAN radio 102 and the cellular radio 110 to coexist within the electronic device 100 by reducing an amount of interference between the cellular signals and received WLAN signals.

Figure 12:
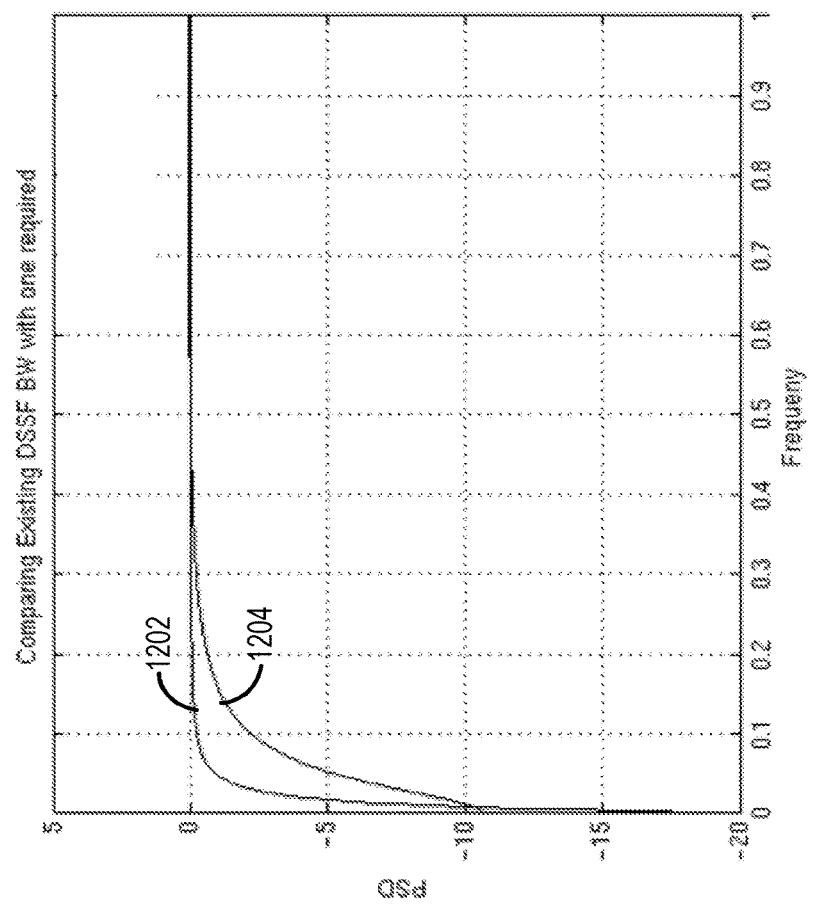
FIG. 12 is an exemplary graph of power spectral densities (PSDs) for digital spur suppression filters (DSSFs), according to certain embodiments.

FIG. 12 is an exemplary graph of power spectral densities (PSDs) for DSSFs, according to certain embodiments. For example, graph 1202 illustrates the PSD for a DSSF where the mode, control parameters, and notch depth may not be completely configurable for each of the individual filter stages, such as when the DSSF mode control bit is set to zero. Graph 1204 illustrates the PSD for a DSSF where the mode, control parameters, and notch depths are configurable for each of the individual filter stages, such as when the DSSF mode control bit is set to one. Also, the PSD graph 1202 corresponds to a DSSF that has two filter stages, and the PSD graph 1204 corresponds to a DSSF that has three individually programmed filter stages.

Figure 13:
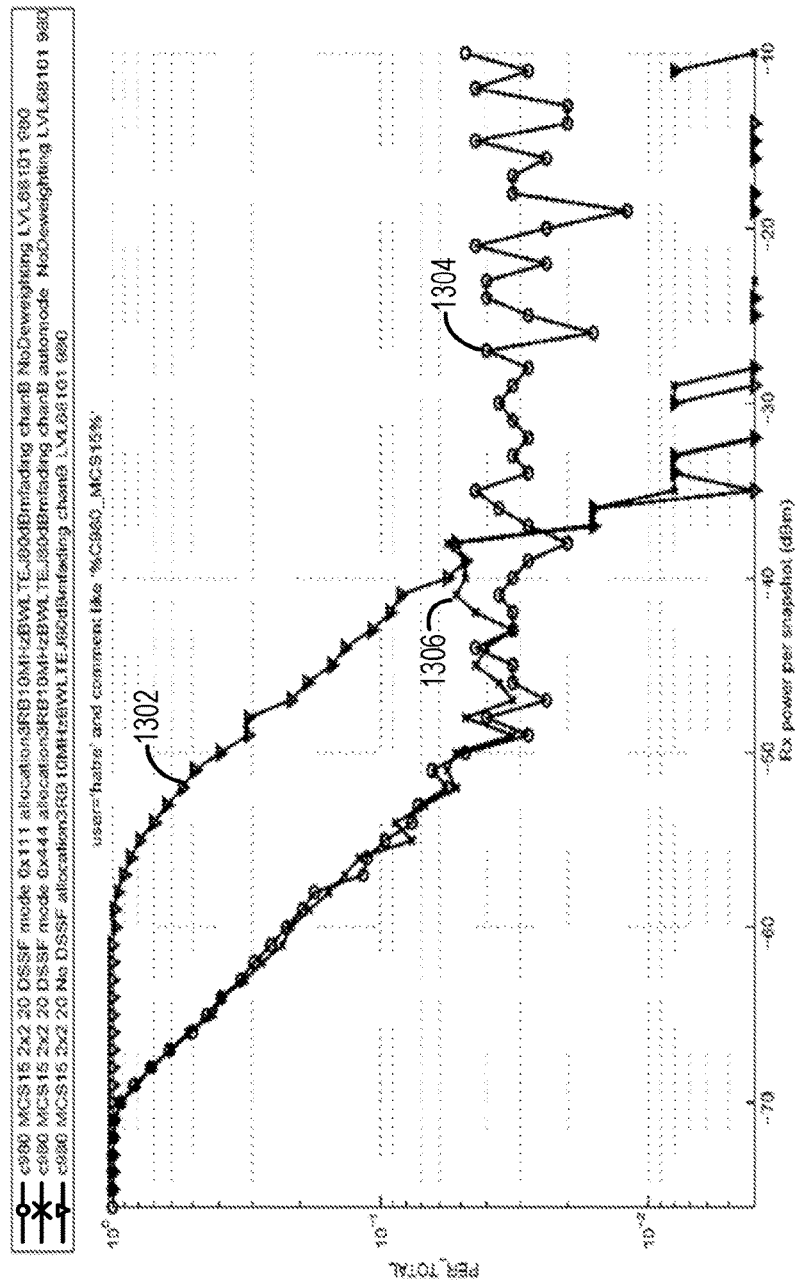
FIG. 13 is an exemplary graph of packet error rates (PERs) for implementations of the DSSF, according to certain embodiments.

FIG. 13 is an exemplary graph of packet error rates (PERs) for implementations of the DSSF in a 11 nB fading channel environment, according to certain embodiments. The graphs represent a response by the WLAN radio 102 to a LTE jammer that is 3 RBs wise and has interference strength of −80 dBm. For example, graph 1302 shows the PER for a received WLAN signal where the DSSF filter is turned off, graph 1304 shows the PER for a received WLAN signal where the stages of the DSSF filter are always on, and graph 1306 shows the PER for a received WLAN signal where the stages of the DSSF filter are in AUTO mode. The graph 1302 shows that the interference from the jammer signal causes greater than 10% of the received packets to be lost for signal strengths less than approximately −45 dBm. The graph 1304 shows that when the filter stages are in the always on mode, received signals that have signal strengths of approximately −58 dBm or greater experience less than 10% packet loss, which is a 13-15% improvement over the PER in graph 1302. At signal strengths greater than approximately −40-50 dBm, PER improvement is fairly low, which shows that above a threshold, applying the DSSF filter may cause more signal degradation than signal improvement.

The graph 1306 shows that when the stages of the DSSF filter are in the AUTO mode, the PER for the received WLAN signal corresponds to the PER for the signal when the DSSF filter is turned on up to the AUTO mode threshold of approximately −41 dBm. At signal strengths greater than the AUTO mode threshold, the graph 1306 corresponds to the graph 1302 for the received WLAN signal when the DSSF filter is turned off.

Figure 14:
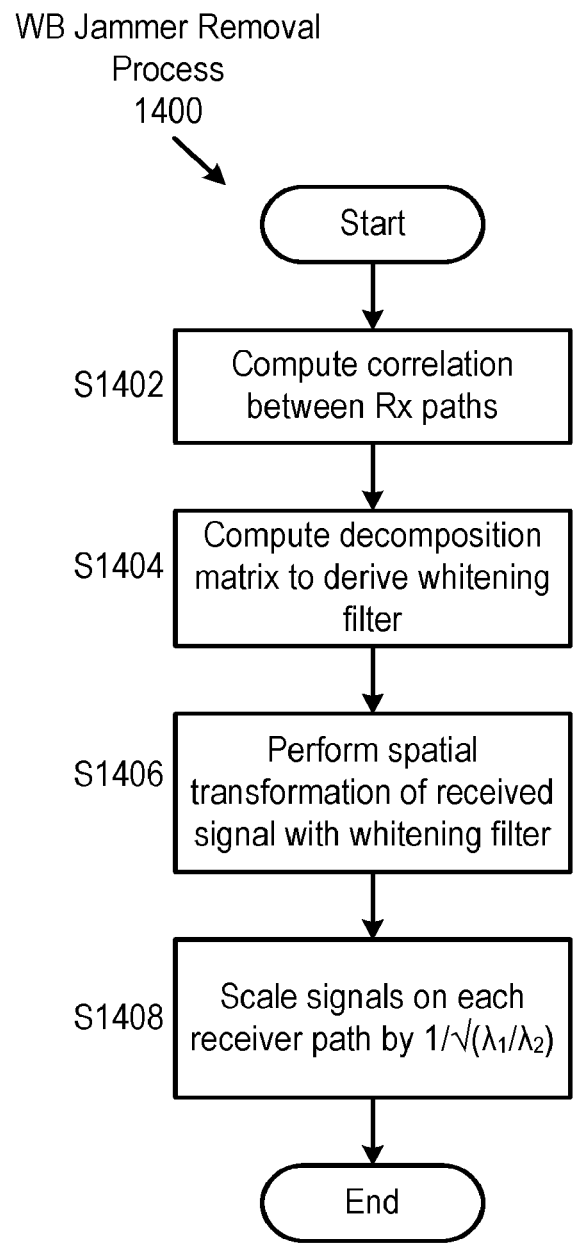
FIG. 14 is an exemplary flowchart of a wideband (WB) jammer removal process, according to certain embodiments.

FIG. 14 is an exemplary flowchart of a wideband (WB) jammer removal process 1400, according to certain embodiments. The WB jammer removal process 1400 is an implementation of step S308 of the interference detection and removal process 300 described previously. For example, if a jammer signal produces 2 MHz of interference with the received WLAN signal, then applying a NB notch filter with a 1 MHz notch only removes half of the jammer signal, which is only a 3 dB improvement. The WB jammer removal process 1400 can be implemented when the jammer signals produce WB interference that can be removed by applying a whitening filter to the received WLAN signal to decorrelate the interference across one or more antenna paths of the WLAN radio 102. In some implementations, the processor 106 determines whether or not to engage the whitening filter based on the signal-to-noise ratio (SNR) of the received WLAN signal. For example, if the SNR is greater than a predetermined threshold, then the processing circuitry may determine not to apply the whitening filter to the WB jammer interference. In addition, other types of notch filters than those described herein can also be applied to remove the jammer signals. The WB jammer removal process 1400 is described with respect to a 2×2 multiple-input multiple-output (MIMO) radio receiver, but the process 1400 can also be applied to other receiver configurations.

At step S1402, the processing circuitry of the processor 106 computes an amount of correlation between one or more receiver antenna paths, also referred to as cores, of the WLAN radio 102. As is the case with a 2×2 MIMO radio receiver, the WLAN radio 102 can have multiple antenna paths in the receiver that are co-located with the cellular radio 110 that is associated with the jammer signals, which means that the interference seen by the antenna paths are correlated, and a correlation factor between the antenna paths may be higher than with non-co-located antenna paths. The processor 106 can estimate correlation statistics for the antenna paths internal to the receiver by computing an interference correlation matrix, which can be a co-variance matrix, R. In an implementation where the WLAN radio 102 includes a 2×2 MIMO receiver, the interference correlation matrix R is a 2×2 matrix in the form:

$$R = \begin{bmatrix} r_{11} & r_{12} \\ r_{12}^* & r_{22} \end{bmatrix}.$$

If an AGC gain factor is modified or a relative gain amount between the antenna paths changes by more than a predetermined amount, then the interference correlation matrix R can be scaled accordingly. For example, g can represent a relative gain difference between two antenna paths where initial gains on both antenna paths are equal. The relative gain difference term g can be applied to the interference correlation matrix R to produce a scaled correlation matrix, $R_S$, which can be described by:

$$R_S = \begin{bmatrix} gr_{11} & r_{12} \\ r_{12}^* & r_{22}/g \end{bmatrix}.$$

At step S1404, an Eigen decomposition matrix is computed from the interference correlation matrix R. For example, the interference correlation matrix R can be expressed as $R = \Phi^H \Sigma \Phi$, where $\Phi$ is a 2×2 eigenvector matrix described by $\Phi = [\phi_1 \ \phi_2]$, where $\phi_1$ and $\phi_2$ are the eigenvectors for the interference correlation matrix R. The processing circuitry derives the whitening filter for the received WLAN signal based on the decomposition of the interference matrix R in order to decorrelate the interference across the antenna paths of the receiver. In addition, eigenvalues $\lambda_1$ and $\lambda_2$ can be determined using the quadratic equation. In some implementations, a condition number $$\kappa = \frac{\lambda_1}{\lambda_2}$$

can be used to determine whether or not to regularize the interference correlation matrix R with a regularization factor, $\alpha$. In addition, when the relative gain difference between the antenna paths has been modified, then the Eigen decomposition matrix $\Phi$ is computed based on the scaled correlation matrix $R_S$.

At step S1406, a rotational transformation of the received WLAN signal is performed in the time domain with the whitening filter by hardware components in the front end 104 of the WLAN radio 102. In some implementations, the hardware components can include four complex multipliers and two adders that transform a received signal x into a transformed signal y according to the following equation:

$$y = \Phi x.$$

The transformation operation aligns the jammer interference onto one antenna path and cleans the other core from the interference. Once the rotational transformation is applied, y and $y^H$ are uncorrelated, and an expected value of $yy^H$ is a diagonal matrix.

At step S1408, the received signals for each receiver antenna path are scaled by a scaling factor in the frequency domain that is based on the computed eigenvalues for the antenna paths of the WLAN radio 102. For example, the scaling factor is $1/\sqrt{\lambda_1/\lambda_2}$. In some implementations, the scaling factor is applied so that the antenna path with the higher amount of interference receives is weighted less than the antenna path with the lesser amount of interference. In some implementations, the scaling factor is applied to the received signals via hardware components in the front end 104 of the WLAN radio 102.

Figure 15:
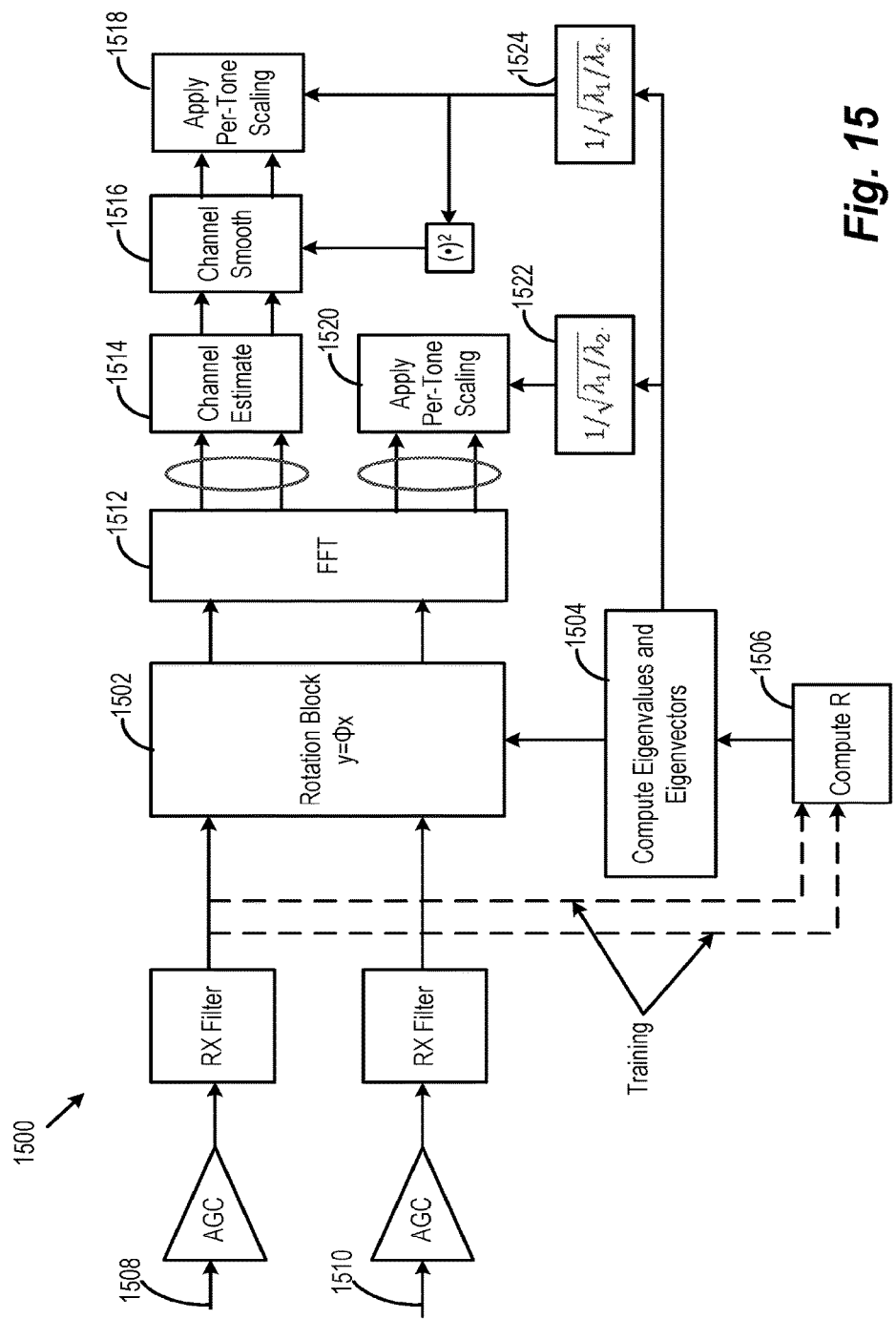
FIG. 15 is an exemplary schematic diagram of an implementation of a whitening filter, according to certain embodiments.

FIG. 15 is an exemplary schematic diagram of an implementation of a whitening filter on a radio receiver 1500, according to certain embodiments. The schematic diagram 1500 includes both hardware blocks that are included in the components of the front end 104 of the WLAN radio 102 as well as software blocks that correspond to processes performed by the processor 106. In one implementation, the radio receiver 1500 is a 2×2 MIMO receiver that has two antenna cores 1508 and 1510. The cores 1508 and 1510 receive WLAN signals that are highly correlated interference due to the co-location of the antennas with the cellular radio 110 that produces the jammer signals.

When the radio receiver 1500 is in a training mode, at block 1506, the processing circuitry of the processor 106 computes the interference correlation matrix R, which is a co-variance matrix for the received WLAN signals. The processing circuitry can then determine correlation statistics for the antenna cores 1508 and 1510. Block 1504 is an eigenvector and eigenvalue computation block where the processing circuitry computes the eigenvectors and eigenvalues for the interference correlation matrix R by determining the Eigen decomposition of R. For example, the interference correlation matrix R can be expressed as $R=\Phi^H \Sigma \Phi$, where $\phi$ is a 2×2 eigenvector matrix described by $\Phi=[\phi_1\ \phi_2]$, where $\phi_1$ and $\phi_2$ are the eigenvectors for the interference correlation matrix R. The processing circuitry derives the whitening filter for the received WLAN signal based on the decomposition of the interference matrix R in order to decorrelate the interference across the antenna paths of the receiver. In addition, eigenvalues $\lambda_1$ and $\lambda_2$ can be determined using the quadratic equation.

Block 1502 is a whitening filter rotational transformation block 1502 where a spatial transformation is performed on the received WLAN signal for each of the antenna cores 1508 and 1510. The rotational transformation is performed in the time domain with the whitening filter by hardware components in the front end 104 of the WLAN radio 102. In some implementations, the hardware components can include four complex multipliers and two adders that transform a received signal x into a transformed signal y according to the following equation:

$$y=\Phi x.$$

The transformation operation aligns the jammer interference onto one antenna path and cleans the other core from the interference. At block 1512, a Fast Fourier Transform is performed to transform the received signals into the frequency domain. Also, channel estimation is performed at block 1514, and channel smoothing is performed at block 1516.

At blocks 1522 and 1524, the processing circuitry of the processor 106 computes a scaling factor of $1/\sqrt{\lambda_1/\lambda_2}$ for the received WLAN signals that is applied in the frequency domain at blocks 1520 and 1518.

Figure 16:
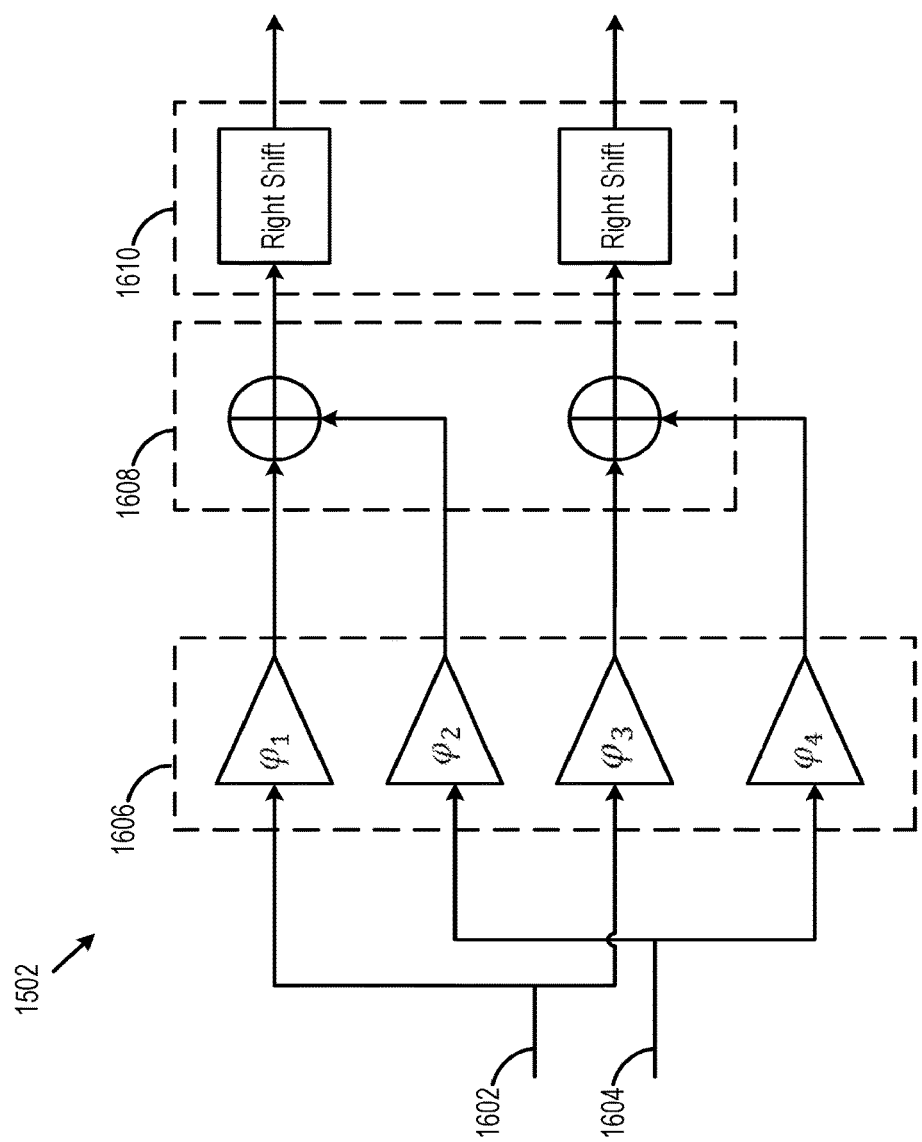
FIG. 16 is an exemplary schematic diagram of a whitening filter rotational transformation.

FIG. 16 is an exemplary schematic diagram of the whitening filter rotational transformation block 1502 that is performed in the time domain with the whitening filter by hardware components in the front end 104 of the WLAN radio 102, according to certain embodiments. The outputs from receiver filters 1602 and 1604 for the antenna cores 1508 and 1510 are input to four complex multipliers 1606 that correspond to eigenvectors from the decomposition of the interference correlation matrix R. The outputs from the multipliers 1606 are fed into two adders 1608, and a right shift is performed at blocks 1610 to produce the output of the rotational transformation block 1502

Figure 17:
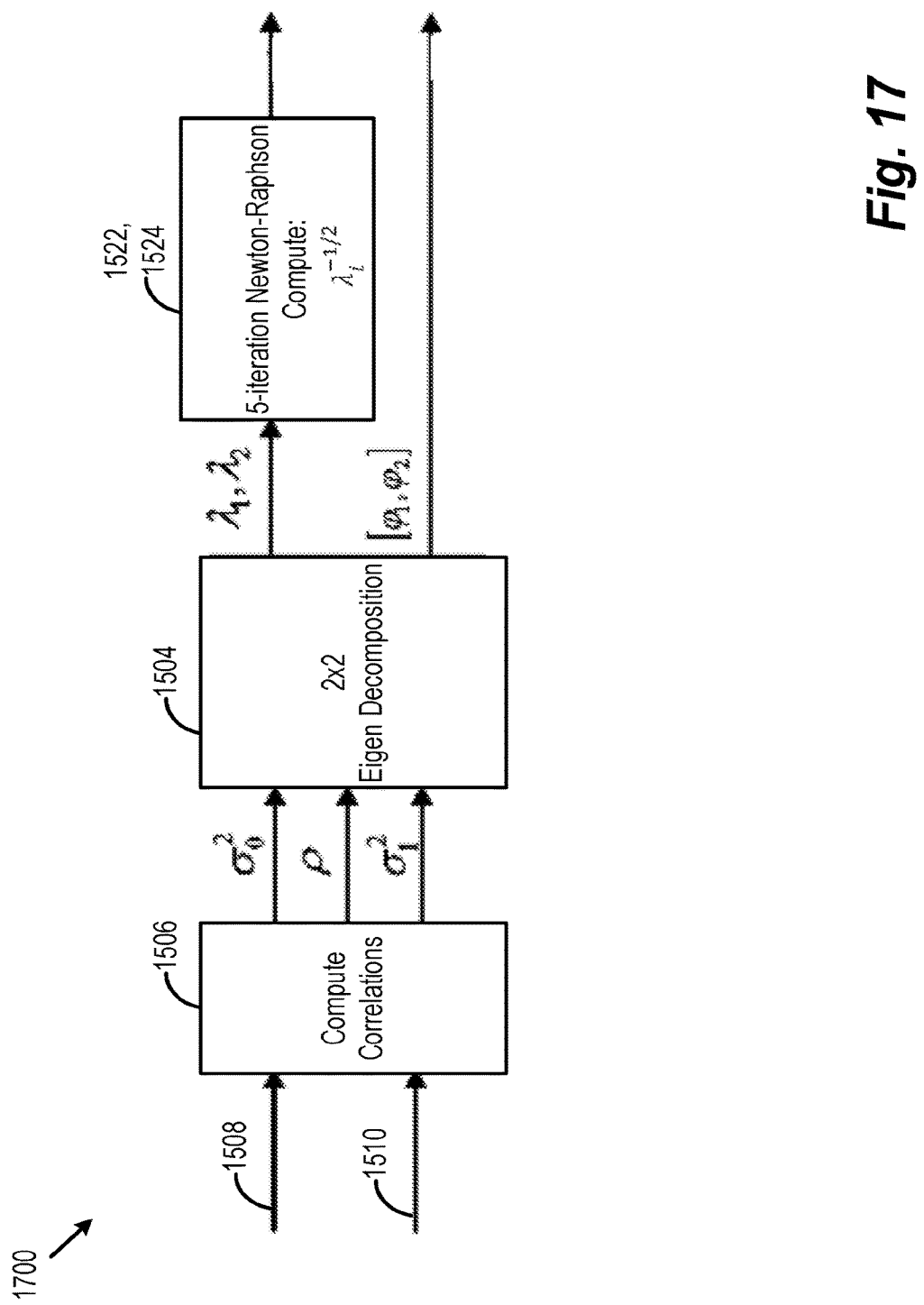
FIG. 17 is an exemplary schematic diagram of a whitening filter estimator, according to certain embodiments.

FIG. 17 is an exemplary schematic diagram of a whitening filter estimator 1700 that includes the interference matrix computation block 1506 and the eigenvector and eigenvalue computation block 1504 from the radio receiver 1500, according to certain embodiments. For example, the whitening filter estimator 1700 includes the cores 1508 and 1510 that receive WLAN signals that are highly correlated interference due to the co-location of the antennas with the cellular radio 110 that produces the jammer signals. At the interference matrix computation block 1506, the processing circuitry computes the correlation matrix R that can also be described by:

$$R = \begin{bmatrix} \sigma_0^2 & \rho \\ \rho^* & \sigma_1^2 \end{bmatrix},$$

where $\sigma_0^2$ and $\sigma_1^2$ are signal strengths of the received signals at the cores 1508 and 1510, and $\rho$ is a correlation value. At the block 1504, processing circuitry computes the eigenvectors $\Phi=[\phi_1\ \phi_2]$ and eigenvalues $\lambda_1$ and $\lambda_2$ for the interference correlation matrix R by determining the Eigen decomposition of R. At blocks 1522 and 1524, the processing circuitry of the processor 106 computes the scaling factor of $1/\sqrt{\lambda_1/\lambda_2}$ by performing a five-iteration Newton-Raphson iteration.

Tables 1-4 below illustrate exemplary results for applying the whitening filter to received WLAN signals experience WB interference from cellular jammers. For example, Table 1 illustrates performance improvements for a full-band 20 MHz-wide LTE jammer at −80 dBm that interferes with various WLAN signal types in an additive white Gaussian noise (AWGN) channel, which shows an improvement in sensitivity. Table 2 illustrates performance improvements for a full-band 20 MHz-wide LTE jammer at −80 dBm that interferes with various WLAN signal types in a 11 nB fading channel, which shows greater improvement than with the AWGN channel.

TABLE 1

| Rate | Filter Off | Filter On | Improvement |
|---|---|---|---|
| MCS8 | −78.5 | −80.0 | 1.5 dB |
| MCS9 | −75.5 | −79.5 | 4.0 dB |
| MCS10 | −72.5 | −77.0 | 4.5 dB |
| MCS11 | −69.5 | −72.5 | 2.0 dB |
| MCS12 | −65.5 | −69.5 | 4.0 dB |
| MCS13 | −62.0 | −64.0 | 2.0 dB |
| MCS14 | −60.5 | −63.0 | 2.5 dB |
| MCS15 | −58.5 | −61.0 | 2.5 dB |

TABLE 2

| Rate | Filter Off | Filter On | Improvement |
|---|---|---|---|
| MCS8 | −68.0 | −78.0 | 10.0 dB |
| MCS9 | −64.0 | −77.5 | 13.5 dB |
| MCS10 | −60.0 | −73.5 | 13.5 dB |
| MCS11 | −58.0 | −65.0 | 7.0 dB |
| MCS12 | −53.0 | −59.0 | 6.0 dB |
| MCS13 | −49.5 | −54.0 | 4.5 dB |
| MCS14 | −48.0 | −52.0 | 4.0 dB |
| MCS15 | −47.0 | −51.0 | 4.0 dB |

Table 3 illustrates performance improvements for a half-band 10 MHz-wide LTE jammer at −80 dBm that interferes with various WLAN signal types in an additive white Gaussian noise (AWGN) channel, which shows an improvement in sensitivity. Table 2 illustrates performance improvements for a half-band 10 MHz-wide LTE jammer at −80 dBm that interferes with various WLAN signal types in a 11 nB fading channel, which also shows greater improvement than with the AWGN channel.

TABLE 3

| Rate | Filter Off | Filter On | Improvement |
|---|---|---|---|
| MCS8 | −75.0 | −77.0 | 2.0 dB |
| MCS9 | −72.0 | −74.5 | 2.5 dB |
| MCS10 | −67.5 | −72.0 | 4.5 dB |

TABLE 3-continued

| Rate | Filter Off | Filter On | Improvement |
|---|---|---|---|
| MCS11 | −66.5 | −69.5 | 3.0 dB |
| MCS12 | −61.5 | −65.5 | 4.0 dB |
| MCS13 | −57.5 | −61.0 | 3.5 dB |
| MCS14 | −55.7 | −59.0 | 3.3 dB |
| MCS15 | −54.0 | −59.0 | 5.0 dB |

TABLE 4

| Rate | Filter Off | Filter On | Improvement |
|---|---|---|---|
| MCS8 | −67.0 | −76.5 | 9.5 dB |
| MCS9 | −62.0 | −72.0 | 10.0 dB |
| MCS10 | −57.0 | −68.5 | 11.5 dB |
| MCS11 | −55.5 | −63.5 | 8.0 dB |
| MCS12 | −50.5 | −57.0 | 6.5 dB |
| MCS13 | −48.0 | −52.5 | 4.5 dB |
| MCS14 | −46.0 | −49.5 | 3.5 dB |
| MCS15 | −44.5 | −50.5 | 6.0 dB |

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Additionally, an implementation may be performed on modules or hardware not identical to those described. Accordingly, other implementations are within the scope that may be claimed.

The invention claimed is:

1. A device comprising:
two radios, each corresponding to a different communication protocol;
a generalized coexistence interface (GCI) that interconnects the two radios, wherein at least one of the radios includes circuitry configured to
determine characteristics of jammer signals associated with a first wireless protocol of another of the two radios based, at least in part, on information received via the GCI,
determine an amount of interference between the jammer signals and a first received signal at the device associated with a second wireless protocol, and
filter the jammer signals from the first received signal in a case that the amount of interference between the jammer signals and the first received signal is greater than a first predetermined threshold,
wherein the circuitry filters the jammer signals from the first received signal using a notch filter in a case that a bandwidth of the jammer signals is less than a second predetermined threshold, and filters the jammer signals from the first received signal using a whitening filter in a case that the bandwidth of the jammer signals is greater than the second predetermined threshold.

2. The device of claim 1, wherein the jammer signals correspond to one or more harmonic frequency bands of a second signal transmitted by the another device.

3. The device of claim 2, wherein the circuitry is further configured to receive the one or more first signal parameters at the GCI via a coexistence message having a predetermined format.

4. The device of claim 3, wherein the coexistence message includes at least one of one or more protocol identification bits, one or more virtual resource block bits, or one or more resource block size bits.

5. The device of claim 1, wherein the circuitry is further configured to receive one or more first signal parameters associated with the first wireless protocol from the another of the two radios via the GCI.

6. The device of claim 5, wherein the one or more first signal parameters include at least one of a virtual resource block (VRB) number or a number of allocated resource blocks for a second signal transmitted by the another of the two radios.

7. The device of claim 5, wherein the circuitry is further configured to determine the amount of interference between the jammer signals and the first received signal based on the one or more first signal parameters and one or more second signal parameters associated with the first wireless protocol and the second wireless protocol.

8. The device of claim 7, wherein the one or more second signal parameters vary at a slower rate than the one or more first signal parameters and include at least one of a center frequency or a center bandwidth of the first wireless protocol or the second wireless protocol.

9. The device of claim 1, wherein the notch filter is a digital spur suppression filter (DSSF) that includes a plurality of stages.

10. The device of claim 9, wherein the DSSF includes three stages.

11. The device of claim 9, wherein the circuitry is further configured to independently determine control parameters for each of the plurality of stages including at least one of an enablement/disablement parameter, a pole/zero parameter, a frequency location parameter, or an auto mode threshold parameter.

12. The device of claim 11, wherein the circuitry is further configured to disable one of the three stages when a received signal strength is greater than the auto mode threshold parameter.

13. The device of claim 11, wherein the circuitry is further configured to determine the auto mode threshold parameter based on characteristics of a signal channel.

14. The device of claim 9, wherein the circuitry is further configured to reduce a notch depth of one or more of the three stages when a desired gain factor is less than a gain threshold.

15. The device of claim 1, wherein the circuitry is further configured to determine the whitening filter based on a decomposition of a noise correlation matrix for one or more antenna paths of the device.

16. The device of claim 15, wherein the circuitry is further configured to whiten the amount of interference between the jammer signals and the first received signal via a spatial rotation operation between the first received signal and the whitening filter to produce a transformed signal.

17. A method comprising:
determining, at a first radio, characteristics of jammer signals associated with a first wireless protocol of another radio connected to the first radio via a generalized coexistence interface (GCI);
determining an amount of interference between the jammer signals and a first received signal at the device associated with a second wireless protocol; and
filtering the jammer signals from the first received signal in a case that the amount of interference between the jammer signals and the first received signal is greater than a first predetermined threshold, wherein the filtering of the jammer signals from the first received signal is performed using a notch filter in a case that a bandwidth of the jammer signals is less than a second predetermined threshold, and the filtering of the jammer signals from the first received signal is performed using a whitening filter in a case that the bandwidth of the jammer signals is greater than the second predetermined threshold.

18. A wireless local area network (WLAN) radio comprising:
   circuitry configured to
      communicate with a cellular radio co-located in an electronic device via a generalized coexistence interface (GCI) that interconnects the WLAN radio and the cellular radio,
      receive signal data associated with cellular transmissions from the cellular radio via the GCI,
      determine an amount of interference between the cellular transmissions from the cellular radio and a received WLAN signal; and
      filter the interference from the cellular transmissions from the received WLAN signal using the signal data associated with the cellular transmissions received via the GCI, when the interference from the cellular transmissions on the received WLAN signal is greater than a first predetermined threshold,
      wherein the circuitry filters the interference using a notch filter in a case that a bandwidth of the interference is less than a second predetermined threshold, and filters the interference using a whitening filter in a case that the bandwidth of the interference is greater than the second predetermined threshold.

* * * * *